(12) United States Patent
Wong

(10) Patent No.: US 11,987,085 B2
(45) Date of Patent: May 21, 2024

(54) CAN-BUS LIGHTING ADAPTOR

(71) Applicant: SPAREX LIMITED, Exeter (GB)

(72) Inventor: David Wong, Exeter (GB)

(73) Assignee: Sparex Limited, Exeter (GB)

( * ) Notice: Subject to any disclaimer, the term of this patent is extended or adjusted under 35 U.S.C. 154(b) by 272 days.

(21) Appl. No.: 17/756,077

(22) PCT Filed: Jun. 4, 2020

(86) PCT No.: PCT/EP2020/065555
§ 371 (c)(1),
(2) Date: May 16, 2022

(87) PCT Pub. No.: WO2021/098993
PCT Pub. Date: May 27, 2021

(65) Prior Publication Data
US 2022/0402319 A1    Dec. 22, 2022

(30) Foreign Application Priority Data
Nov. 18, 2019   (GB) ..................................... 1916749

(51) Int. Cl.
*B60D 1/62*     (2006.01)
*B60Q 1/00*     (2006.01)
(Continued)

(52) U.S. Cl.
CPC .............. *B60D 1/62* (2013.01); *B60Q 1/0088* (2013.01); *B60Q 1/2615* (2013.01);
(Continued)

(58) Field of Classification Search
CPC .......... B60D 1/62; B60Q 1/0088–0094; B60Q 1/2615; B60Q 1/2696; B60Q 1/305;
(Continued)

(56) References Cited

U.S. PATENT DOCUMENTS

2013/0020937 A1   1/2013   Tatara et al.
2015/0251584 A1   9/2015   Deyaf
(Continued)

FOREIGN PATENT DOCUMENTS

CN     107097716 A     8/2017
CN     108819847 A     11/2018
(Continued)

OTHER PUBLICATIONS

UK Intellectual Property Office, Search report for related UK Application No. GB1916749.3, dated Apr. 1, 2020.
(Continued)

*Primary Examiner* — Jason M Han

(57) ABSTRACT

An adaptor for connecting an LED lighting unit to a vehicle CAN-bus. The adaptor has a connector connectable to a corresponding connector on a vehicle, to receive a lighting current from the CAN-bus of the vehicle. A wireless power transmitter of the adaptor wirelessly transmits power to the LED lighting unit at a first level, typically suited to LED operation. The adaptor further includes one or more resistors connected between the connector and transmitter and arranged to draw power from the connector at a second power level higher than the first power level, which second power level is suitably equivalent to that for halogen or filament lighting.

12 Claims, 2 Drawing Sheets

(51) Int. Cl.
  *B60Q 1/26* (2006.01)
  *B60Q 1/30* (2006.01)
  *B60Q 1/34* (2006.01)
  *B60Q 1/46* (2006.01)
  *B60Q 1/56* (2006.01)
  *F21S 43/14* (2018.01)

(52) U.S. Cl.
  CPC .......... *B60Q 1/2696* (2013.01); *B60Q 1/305* (2013.01); *B60Q 1/34* (2013.01); *B60Q 1/46* (2013.01); *B60Q 1/56* (2013.01); *F21S 43/14* (2018.01)

(58) Field of Classification Search
  CPC ... B60Q 1/34; B60Q 1/46; B60Q 1/56; B60Q 11/00–007; B60Q 2900/30; F21S 43/14
  See application file for complete search history.

(56) References Cited

U.S. PATENT DOCUMENTS

| | | |
|---|---|---|
| 2015/0257242 A1 | 9/2015 | Deyaf |
| 2017/0080852 A1 | 3/2017 | Shanahan |
| 2019/0315170 A1 | 10/2019 | Williams |
| 2020/0086781 A1 | 3/2020 | Gonzalez Juanes et al. |

FOREIGN PATENT DOCUMENTS

| | | |
|---|---|---|
| EP | 2000358 A1 | 12/2008 |
| WO | 2018/051118 A1 | 3/2018 |

OTHER PUBLICATIONS

European Patent Office, International Search Report related to International Patent Application No. PCT/EP2020/065555, mail date Aug. 24, 2020.

CAN-BUS LIGHTING ADAPTOR

FIELD OF THE INVENTION

The invention relates to lighting systems for vehicles and, in particular, to the control of one or more vehicle lights via a Controller Area Network bus (hereinafter CAN-bus) system of a vehicle.

BACKGROUND

A conventional CAN-bus controlled lighting arrangement is illustrated schematically in FIG. 1 of the attached drawings and comprises a CAN-bus control unit 10 connected via respective bus lines 12, 14, 16 to controlled units such as a wiper motor 18, and left 20 and right 22 lighting units. Each of the lighting units 20, 22 includes one or more halogen bulbs 20A, 22A typically rated at 21 W. The lighting units are configured as, for example, left or right indicator or warning lamps, reversing lights or number plate illumination lamps. The lighting units may be directly mounted to the vehicle hosting the CAN-bus control unit 10, or they may be mounted to a trailed vehicle such as a trailer or caravan (and referred to generally herein as a trailer) towed by the hosting vehicle. In the latter case, electrical supply to the trailer lights is typically provided by a jumper cable of the trailer which plugs into a conventional 7-pin trailer electrical socket of the hosting vehicle.

Also connected to the CAN-bus control unit 10 and positioned within the cab or driver space of the hosting vehicle is a warning light indicator 24, which may be a simple indicator lamp or may be a message display matrix or display on a dashboard of the hosting vehicle. In operation, the CAN-bus control unit 10 determines the currents drawn by each of the lighting units 20, 22 when those lights are switched on. If the CAN-bus controller 10 detects zero or minimal current draw on a line 14, 16 to a lighting unit 20, 22, this is taken as an indication that the respective lighting unit has failed, and the CAN-bus controller 10 activates the warning light indicator 24 to provide a "bulb-out" indication to the driver.

Increasingly, halogen bulbs are being replaced on vehicles by single or clustered light-emitting diode (LED) devices which are more robust and have a longer operating life than halogen bulbs. This is represented by FIG. 2 of the attached drawings, which corresponds to FIG. 1 save for the replacement of halogen bulbs 20A, 22A by LED lights 20B, 22B.

A further factor leading to the adoption of LED's over halogen bulbs is their lower power consumption, typically 5 W. However, due to the fact that a LED light source consumes very low electric wattage, in most CAN-bus linked vehicles, the CAN-bus control unit 10 cannot detect the wattage requirement or expected current draw in the connecting bus line and results in either no transmission of electric current to an LED light unit, or transmission of an incorrect amount. As a result, no current (or intermittent current) is supplied, and the "bulb out" warning light indicator 24 on the vehicle dashboard is illuminated.

One approach to the problem is provided by known in-line adaptors which adjust the LED power levels to those equivalent to halogen bulbs, but such units are not always simple to retro-fit and may have problems such as overheating. Each function requires a separate resistor to adjust the power level and potentially 4 or 5 individual resistors would be required for one set of lights. Resistor produced heat and multiple resistors could cause over-heat damage to surrounding wiring and equipment resulting in fire hazards. Extra wiring connections also increase the risk of circuit fault, wear & tear and reliability issue to the circuit.

It is an object of the invention to provide an adaptor that overcomes one or more of the disadvantages mentioned above.

SUMMARY OF THE INVENTION

In accordance with a first aspect of the present there is provided an adaptor for connecting an LED light to a vehicle CAN-bus, comprising:
    a connector connectable to receive a lighting current from a CAN-bus;
    a wireless power transmitter configured to wirelessly transmit power at a first level; and
    one or more resistors connected between the connector and transmitter and arranged to draw power from the connector at a second power level higher than the first power level.

By providing for wireless power delivery to a light, the adaptor facilitates the retro-fitting or replacement of halogen/filament units by longer-lasting LED units without requiring rewiring.

Suitably, the first power level is sufficient to drive an LED (e.g. 2-5 W), and the second power level is sufficient to drive a halogen/filament lamp (e.g. 21 W). Through the use of the resistor or resistors, the transmitter requests the wattage value expected on a CAN-bus for a halogen/filament lamp (which stops the "bulb out" warning from illuminating) and converts it to a lower power value for wireless transmission to power an LED light source, suitably via a 2.4 GHz transmission.

Preferably, the adaptor further comprises a control unit coupled between the wireless transmitter and CAN-bus connection and configured to cause the wireless power transmitter to wirelessly transmit one or more control signals in response to signals received from a CAN-bus.

The adaptor suitably further comprises heat dissipation means coupled to dissipate heat from the said one or more resistors. Preferably, such heat dissipation means are switchable, under control of a control unit of the adaptor, to dissipate heat when the current through the said one or more resistors exceeds a predetermined threshold level.

In a further aspect, the present invention provides a vehicle lighting system comprising an adaptor as recited above in combination with a lighting unit including one or more LED's, the lighting unit including a receiver configured to receive a transmission from the wireless power transmitter of the adaptor and drive said one or more LED's by the same.

In such an arrangement, the lighting unit preferably includes a transmitter configured to determine a status signal indicative of operation of the one or more LED's and wirelessly transmit the same to the adaptor, with the adaptor being configured to wirelessly receive the same and generate a signal on a connected CAN-bus in response. The lighting unit may be configured as a trailed vehicle lighting unit to be attached to a trailed unit (trailer) towed by a vehicle having said CAN-bus, the lighting unit comprising plural LED's arranged as one or more of
    left/right indicator lamps;
    hazard warning lamps;
    reversing lamps;
    number plate illumination lamps.

The CAN-bus compatible trailer lighting wireless transmitter allows CAN-bus module vehicles to benefit the use of LED lighting for trailer towing where it was not possible before. Preferably, the lighting unit further comprises user-operable attachment means (such as one or more releasable magnetic clamps) by operation of which the unit may be removably attached to a host vehicle or trailer towed by the same. Such an attachment facility adds to the functionality by enabling a given lighting unit to be used on multiple trailers, driven each time by the same wireless adaptor, such that none of the multiple trailers requires a dedicated and fixed wiring loom for any specific configuration of lighting unit.

BRIEF DESCRIPTION OF THE DRAWINGS

The invention will now be described, by way of example only, with reference to the accompanying drawings in which.

DETAILED DESCRIPTION OF SPECIFIC EMBODIMENTS OF THE INVENTION

Figure 1:
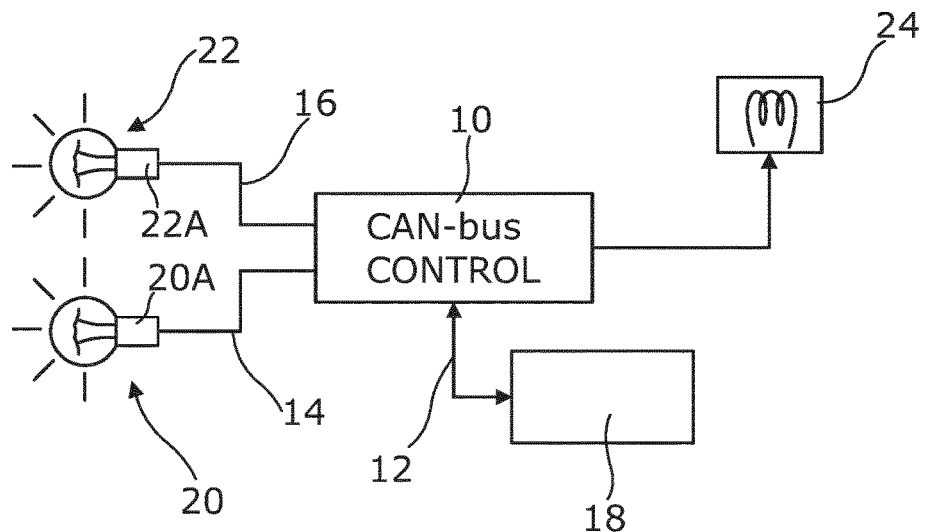
FIG. 1 schematically represents a conventional CAN-bus controlled vehicle lighting arrangement having halogen/filament bulbs as described previously.
Figure 2:
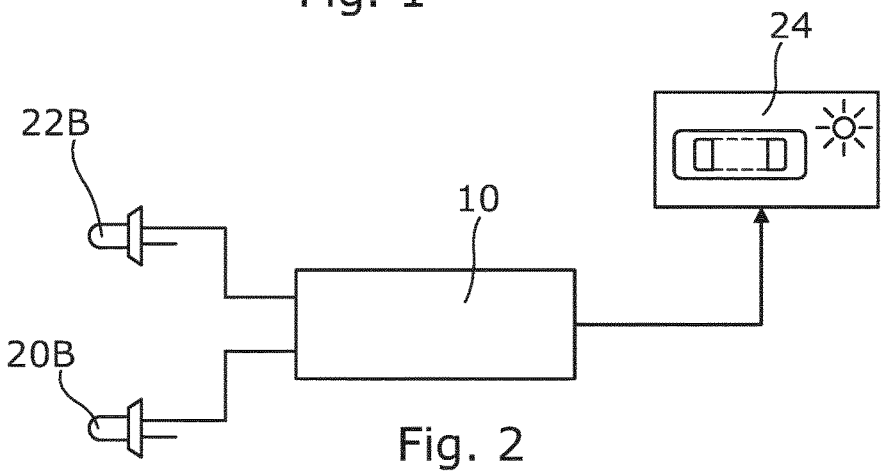
FIG. 2 is a variant of the arrangement of FIG. 1, with the halogen/filament bulbs replaced by LED units, as described previously.
Figure 5:
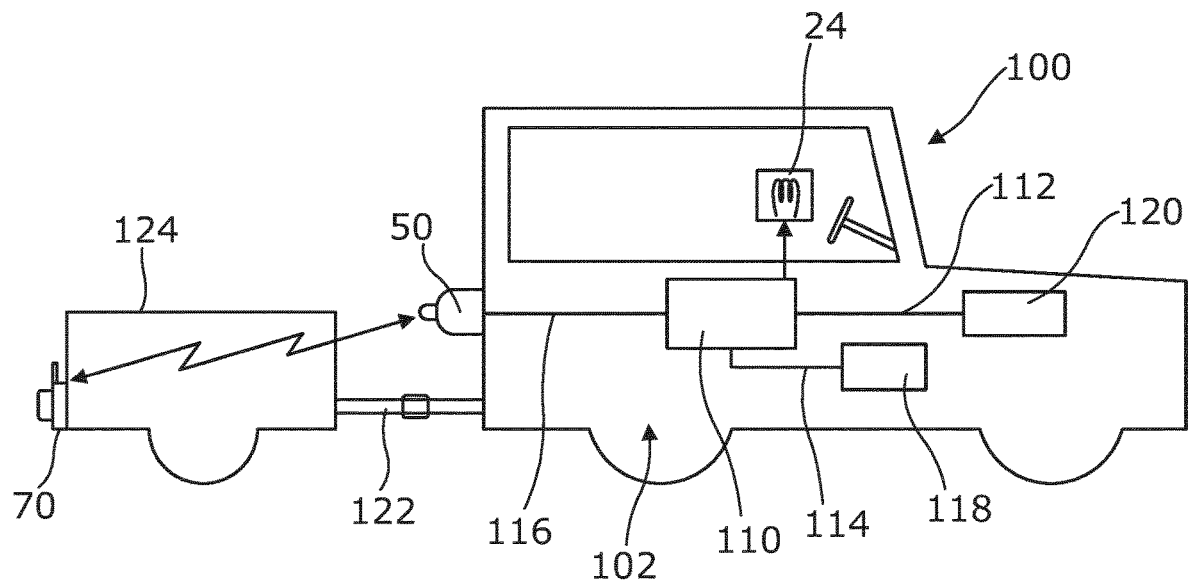
FIG. 5 schematically represents an embodiment of a vehicle lighting system, comprising the adaptor of FIG. 3 and lighting unit of FIG. 4A, B, in accordance with a further aspect of the present invention.

FIG. 5 schematically represents a vehicle 100 having a 12- or 24-volt CAN-bus control system, indicated generally at 102. The system includes a CAN-bus control unit 110 connected via respective bus lines 112, 114, 116 to controlled units such as a wiper motor 118, and front lighting cluster 120. The vehicle 100 is attached to a towed vehicle or caravan (hereinafter "trailer") 124 by a conventional mechanical towing link 122. Plugged into a connection to the CAN-bus on the vehicle is an adaptor 50 described in further detail below with reference to FIG. 3. Mounted on the trailer 124 is a lighting unit 70 comprising one or several LED's or arrays of LED's performing specific functions (described further below with reference to FIGS. 4A, 4B). The adaptor 50 and trailer lighting unit 70 are configured for the wireless delivery of power (e.g. on a 2.4 GHz transmission) from adaptor to trailer, and further wirelessly to avoid the need for a hard-wired interconnection.

Figure 3:
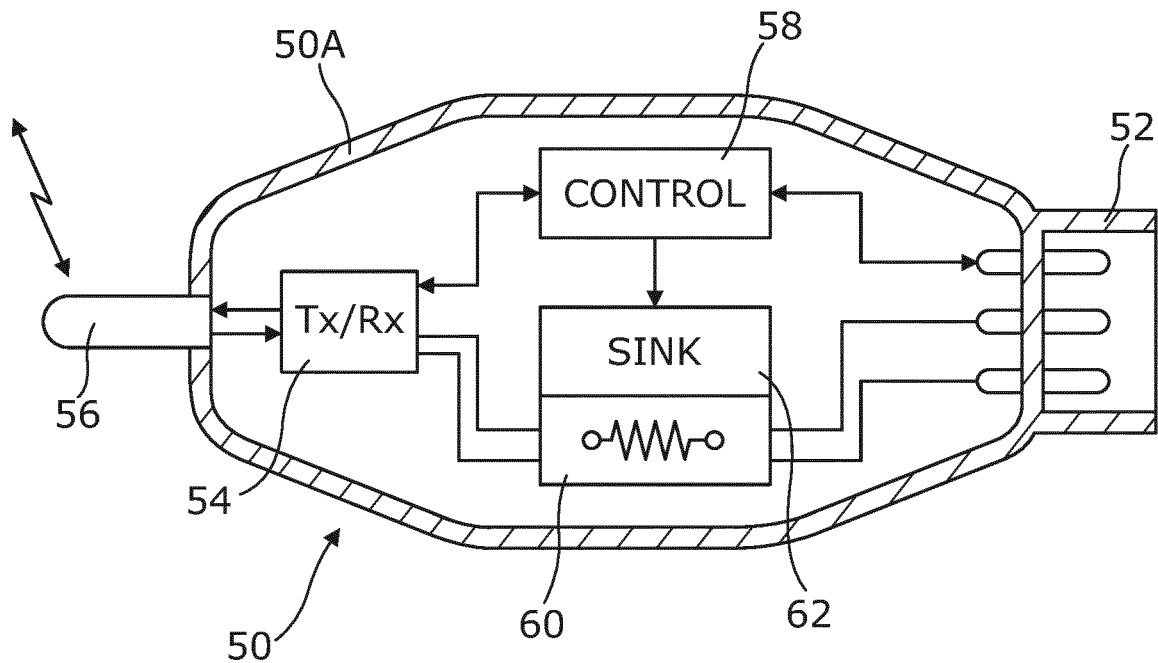
FIG. 3 is a schematic sectional view through an adaptor in accordance with a first aspect of the present invention.

FIG. 3 is a schematic sectional view through a wireless adaptor, indicated generally at 50. The adaptor comprises a housing 50A at one end of which is a connector 52, such as a conventional 7-pin trailer plug, to be received by a matching socket on a hosting vehicle and thereby provide electrical connection of the adaptor 50 to a CAN-bus of the hosting vehicle. The housing is suitably formed of aluminium alloy, with two moulded halves screwed together with silicone sealant to provide water and dust resistance.

Within the housing 50A there is mounted a transmitter and receiver unit 54 which is coupled with an antenna 56 mounted to the exterior of the housing 50A.

An adaptor control module 58 is connected to one or more pins of the connector 52 (and thereby to the vehicle CAN-bus) and also connected to the transmitter and receiver unit 54. The control module 58 is configured to cause the transmitter and receiver unit 54 to wirelessly transmit one or more control signals via antenna 56 in response to signals received from a CAN-bus.

The adaptor includes one or more resistors 60 coupled with the connector 52 and used in the adjustment of wattage levels to threshold values expected by a CAN-bus control unit 10 for halogen/filament lighting. To counter the build-up of heat in the resistors 60, heat dissipation means 62 in the form of a heatsink or cooling fan are provided within the adaptor housing 50A to avoid damage to PCB components within the housing. Preferably, the heat dissipation means 62 are switchable, under control of the adaptor control module 58, to dissipate heat when the power being dissipated (current through the resistors) exceeds a predetermined threshold level, which current/power level may be monitored by the control module 58 directly, or a temperature sensor (not shown) coupled to the control module and triggered when the internal temperature of adaptor reaches 90 degrees centigrade, may be employed.

Figure 4A:
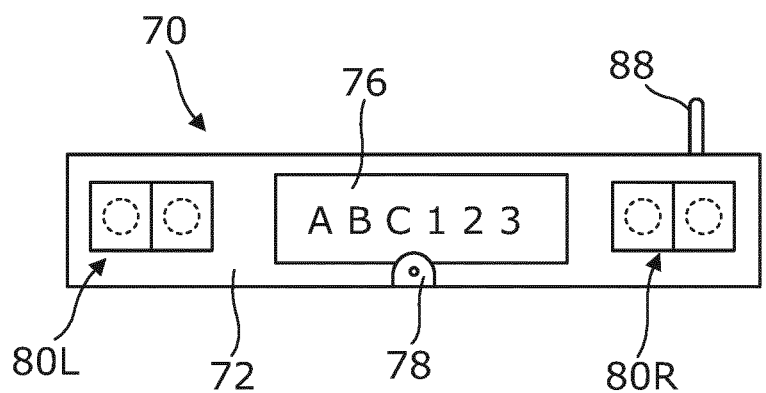
FIGS. 4A and 4B are respectively front and side elevations of a vehicle lighting unit suitable for use with the adaptor of FIG. 3.
Figure 4B:
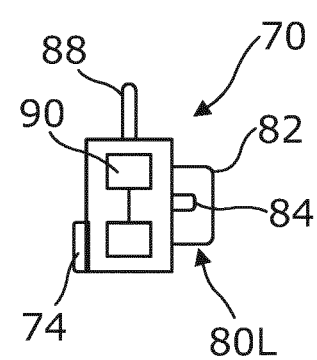

Advantageously, the adaptor of FIG. 3 may be used to wirelessly drive a vehicle lighting unit for a vehicle trailer, allowing such a unit to be simply retrofitted (or temporarily fitted) to a trailer without requiring the provision of a wiring loom for the trailer. A suitable configuration for such an LED lighting unit, indicated generally at 70, is shown in FIGS. 4A and 4B.

The LED lighting unit 70 has an elongate body portion 72 which is suitably configured for attachment across the rear of a trailer. Various permanent attachment mechanisms (not shown) in the form of screws, bolts or adhesives may be employed. Alternatively, temporary attachment means in the form of releasable magnetic clamps 74 add to the functionality by enabling a given lighting unit to be used on multiple trailers, driven each time by the wireless adaptor 50, such that none of the multiple trailers requires a dedicated and fixed wiring loom for any specific configuration of lighting unit.

The elongate body portion suitably includes a central mounting for a vehicle number plate 76, with a first LED 78 of the lighting unit positioned to illuminate the number plate 76. To either side of the number plate 76 there are mounted left and right indicator lamp clusters 80L, 80R each having a protective cover 82 and including typically two or more LED's or LED clusters 84 being positioned, coloured and controlled (from the CAM-bus) as direction indicator or hazard warning lights, reversing lights or braking indicator lights.

The lighting unit 70 includes an antenna 88 coupled with a receiver/transmitter stage 90 configured to receive a transmission from the wireless power transmitter 54 of the adaptor 50 and drive the mounted LED's or LED clusters 78, 84 by the same. Preferably, the receiver/transmitter stage 90 includes control and/or monitoring circuitry configured to determine a status signal indicative of operation of the one or more LED's and wirelessly transmit the same to the adaptor, with the adaptor being configured to wirelessly receive the same and generate a signal on a connected CAN-bus in response.

In the foregoing, the applicants have described an adaptor 50 for connecting an LED lighting unit to a vehicle CAN-bus. The adaptor has a connector 52 connectable to a corresponding connector on a vehicle, to receive a lighting current from a CAN-bus of the vehicle. A wireless power transmitter 54 of the adaptor 50 wirelessly transmits power to an LED lighting unit at a first level, typically suited to LED operation. The adaptor 50 further includes one or more resistors 60 connected between the connector 52 and transmitter 54 and arranged to draw power from the connector 52 at a second power level higher than the first power level, which second power level is suitably equivalent to that for halogen or filament lighting.

From reading the present disclosure, other modifications will be apparent to persons skilled in the art. Such modifications may involve other features which are already known in the field of CAN-bus systems and/or vehicle lighting systems and component parts thereof and which may be used instead of or in addition to features already described herein.

The invention claimed is:

1. An adaptor for connecting an LED light to a vehicle CAN-bus, comprising:
    a connector to receive a lighting current from the CAN-bus;
    a wireless power transmitter configured to wirelessly transmit power at a first level; and
    one or more resistors connected between the connector and transmitter and arranged to draw power from the connector at a second power level higher than the first power level.

2. The adaptor of claim 1, wherein the first power level is sufficient to drive an LED, and the second power level is sufficient to drive a filament lamp.

3. The adaptor of claim 1, wherein the first power level is 2W and the second power level is 21W.

4. The adaptor of claim 1, wherein the wireless power transmitter transmits at 2.4 GHz.

5. The adaptor of claim 1, further comprising a control unit coupled between the wireless transmitter and a connection to the CAN-bus configured to cause the wireless power transmitter to wirelessly transmit one or more control signals in response to signals received from the CAN-bus.

6. The adaptor of claim 1, further comprising a heat dissipation mechanism coupled to the one or more resistors.

7. The adaptor of claim 5, further comprising a heat dissipation mechanism coupled to the one or more resistors, wherein the heat dissipation mechanisms are switchable, under control of the control unit, to dissipate heat when current through the one or more resistors exceeds a predetermined threshold level.

8. A vehicle lighting system comprising:
    the adaptor of claim 1; and
    a lighting unit comprising one or more LED's; and a receiver configured to receive a transmission from the wireless power transmitter and drive the one or more LED's by the received transmission.

9. The vehicle lighting system of claim 8, wherein the lighting unit further comprises:
    a transmitter configured to determine a status signal indicative of operation of the one or more LED's and wirelessly transmit the status signal to the adaptor, wherein the adaptor is configured to wirelessly receive the status signal and generate a response signal on the vehicle CAN-bus, which is attached, in response.

10. The vehicle lighting system of claim 8, wherein the lighting unit is configured as a trailed vehicle lighting unit when attached to a trailed unit towed by the vehicle comprising the CAN-bus, the lighting unit further comprising plural LED's arranged as one or more of
    left/right indicator lamps;
    hazard warning lamps;
    reversing lamps; and
    number plate illumination lamps.

11. The vehicle lighting system of claim 8, wherein the lighting unit further comprises user-operable attachment mechanisms by which the lighting unit may be removably attached to the vehicle.

12. The vehicle lighting system of claim 11, wherein the user-operable attachment mechanisms comprise at least one releasable magnetic clamp.

* * * * *